March 5, 1935. G. EGLOFF 1,993,503
CRACKING NORMALLY INCONDENSIBLE HYDROCARBON GASES
Filed March 22, 1930
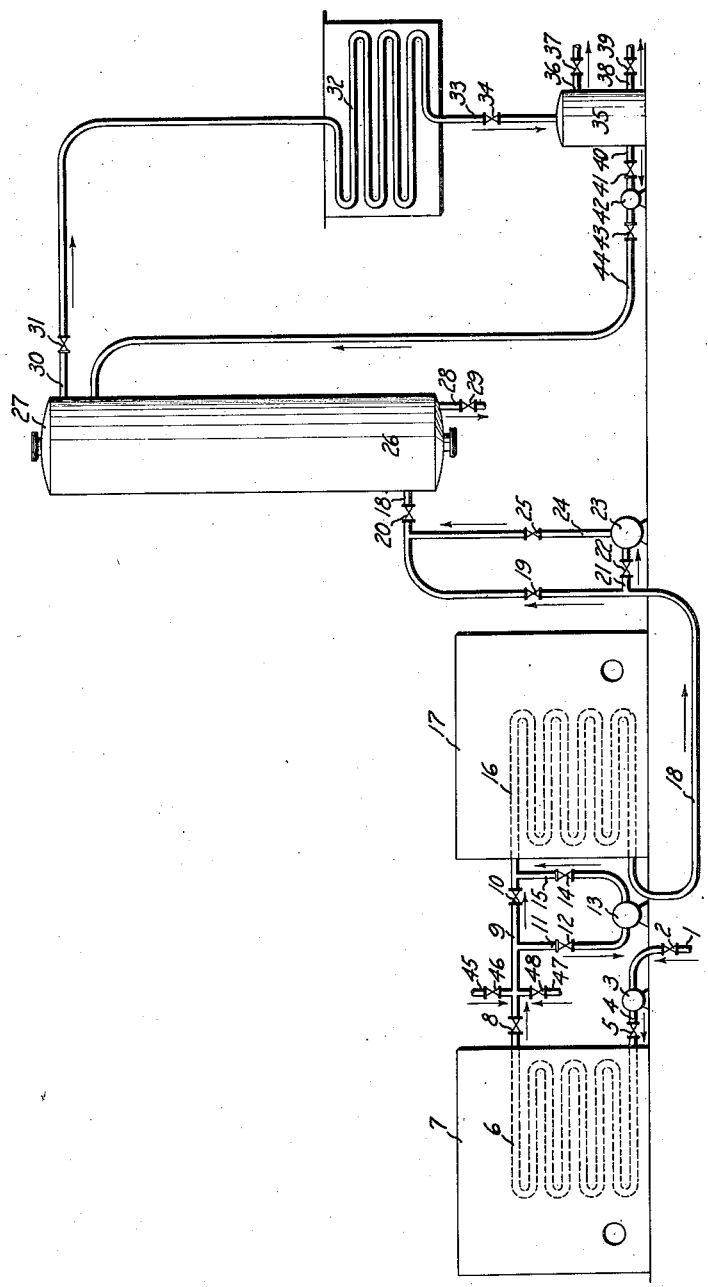
INVENTOR
Gustav Egloff
BY Frank L. Belknap
ATTORNEY Patented Mar. 5, 1935

1,993,503

UNITED STATES PATENT OFFICE 1,993,503

CRACKING NORMALLY INCONDENSABLE HYDROCARBON GASES

Gustav Egloff, Chicago, Ill., assignor to Universal Oil Products Company, Chicago, Ill., a corporation of South Dakota Application March 22, 1930, Serial No. 437,978

4 Claims. (Cl. 196—10)

This process relates to cracking normally incondensable hydrocarbon gases and pertains in its specific embodiment to treating natural gas, cracked gases, refinery gases and the like at elevated temperatures with activated or atomic hydrogen and activated steam, preferably in the presence of catalysts for the purpose of producing liquid solvents or anti-knock compounds such as, for example, alcohol-like compounds, aromatic and unsaturated hydrocarbons.

In the practice of my invention, hydrocarbon gases such as coal gas, natural gas, incondensable gases from cracking operations and other refinery gases, or mixtures thereof, are preferably subjected to cracking conditions at elevated temperature and pressure together with activated steam and/or activated hydrogen. and/or atomic hydrogen. By activated hydrogen or activated steam, I mean these gases which have been subjected to an electrical discharge under suitable electrical, temperature and pressure conditions or to other means of activation so that the gases are in a highly reactive condition. The reaction is preferably carried out in the presence of a catalyst. Examples of the catalyst are metals such as tungsten, vanadium, iron, cobalt, nickel, chromium, tin, lead, zinc, etc., their oxides and other compounds, or mixtures thereof. The catalyst is preferably distributed on a distributing agent such as broken tile for the purpose of exposing a large catalytic reaction surface.

In the preferred embodiment of the practice of my invention, the hydrocarbon gases are heated in a preliminary heating element for the purpose of bringing the gases to a suitable temperature before introducing the atomic hydrogen and activated steam to facilitate or speed up the desired reaction.

The attached drawing, which is diagrammatic and not drawn to scale, illustrates one of the many suitable forms of apparatus to which my process is applicable.

With reference to the drawing, gas such as natural gas, producer gas, coal gas, water gas, refinery gases, and more particularly uncondensed gases from a cracking process, or any combination of suitable gases such as above mentioned, may be supplied through line 1 and valve 2 to pump 3 and thence fed through line 4 and valve 5 into heating element 6.

Heating element 6 is located in any suitable form of furnace 7 and the gases passing through this heating element may be subjected to the desired conditions of temperature and pressure, and the heated and/or converted vapors may be discharged through valve 8, line 9 and valve 10 into heating element 16. Activated or atomic hydrogen may be introduced into the gases passing through line 9 and is supplied through line 45 controlled by valve 46. Activated steam may also be introduced into the vapors in line 9 through line 47 and valve 48.

The pressure on the products from line 9 is preferably increased above the pressure maintained in heating element 6 before these products enter heating element 16, as high pressure tends to render the cracked hydrocarbon gases more susceptible to the action of the activated steam and activated or atomic hydrogen. This increase in pressure may be accomplished by closing valve 10 and passing the products from line 9 through line 11 and valve 12 to pump 13 which feeds the products at the desired increased pressure through valve 14 in line 15 back into line 9 and thence through heating element 16 where they are subjected to further cracking in the presence of the activated or atomic hydrogen and activated steam.

Heating element 16 is located in any suitable furnace setting 17, and the material passing therethrough may be subjected to the desired conditions of temperature and pressure. Products from heating element 16 may pass through line 18, valve 19 and valve 20 into catalyzing and reaction chamber 26 which, in this case, forms the lower portion of chamber 27. If greater pressures are to be employed in chamber 26 than in heating element 16, the products from heating element 16 may, by closing valve 19, be passed through line 21 and valve 22 into pump 23 and thence fed at increased pressure through line 24 and valve 25 back into line 18 and thence through valve 20 into chamber 26.

The vapors entering chamber 26 may be subjected to the catalytic action of such materials as already described. These materials are, in the case illustrated, contained in chamber 26 and disposed on trays therein or in any other suitable manner such that intimate contact is obtained between the vapors and the catalyst.

Vapors leaving the catalytic chamber 26 may be subjected to fractionation in the upper portion of chamber 27. Vapors condensed in passing through the catalyst and in the fractionating portion of chamber 27 may be removed as liquid through line 28 and valve 29.

Vapors from the top of chamber 27 may pass through line 30 and valve 31, may be subjected to condensation and cooling in condenser 32, thereafter passing through line 33 and valve 34 into receiver 35, uncondensed vapors from which may be released through line 36 controlled by valve 37 and condensed distillate from which may be withdrawn through line 38 and valve 39.

A portion of the condensed distillate from receiver 35 withdrawn through line 40 and valve 41 may be fed by means of pump 42 through valve 43 and line 44 to the upper portion of fractionating section of chamber 27 to assist fractionation and cooling in this zone.

Pressures employed throughout the system may range from sub-atmospheric to high super-atmospheric pressure of, say 2000 pounds per square inch, more or less. Substantially equalized pressure may be maintained throughout the entire system, or differential pressures may be employed between the various elements. Preferably heating element 16 is operated under a higher pressure than that employed in heating element 6, and the pressure employed in chamber 26 may be still further increased or may be substantially reduced. Pressures reduced below those employed in chamber 26 may be utilized in condenser 32 and receiver 35. Conversion temperatures employed may range from 1000° F. to 2000° F., more or less, and preferably more severe cracking conditions are employed in heating element 16 than in heating element 6.

As an illustration of the operation of the process of my invention and the results obtained, cracked gases are heated in the heating element 6 to a temperature of approximately 1150° F., and a pressure of approximately 35 pounds per square inch. Approximately 8% by volume of the cracked gas processed, of atomic hydrogen is then introduced and a similar amount of activated steam. This mixture is then pumped into the heating element 16 where it is heated to approximately 1320° F. at a pressure of approximately 135 pounds per square inch and discharged into the catalyst chamber containing a mixture of chromium and nickel catalysts.

The liquid product removed from the receiver 35 is a highly aromatic product containing approximately 95% of hydrocarbons boiling within the motor fuel boiling point range and having an anti-knock value equivalent to approximately 80% benzol in Pennsylvania straight-run gasoline. The yield of the liquid product is approximately 4 gallons per 1000 cubic feet of gas.

The examples given are for illustrative purposes only and are not to be construed as limitations upon the broad scope of my invention.

I claim as my invention:

1. A process of cracking normally incondensable hydrocarbon gas which comprises subjecting said gases to cracking conditions of temperature and pressure while in the presence of steam and hydrogen pre-activated by electrical discharge, and then subjecting the gases to a stabilizing action at an increased pressure in the presence of a catalyst.

2. A process of cracking normally incondensable hydrocarbon gas which comprises subjecting the gases to a primary cracking reaction under cracking conditions of temperature and pressure, and then subjecting the gases to a secondary cracking reaction at an increased temperature and increased pressure in the presence of steam and hydrogen pre-activated by electrical discharge.

3. A process of cracking normally incondensable hydrocarbon gas which comprises subjecting the gas to a primary cracking reaction under cracking conditions of temperature and low pressure, and then subjecting the gas to a secondary cracking reaction under cracking conditions of temperature and high pressure while in the presence of steam and hydrogen pre-activated by electrical discharge.

4. A process of cracking normally incondensable hydrocarbon gas which comprises subjecting the gases to a primary cracking reaction under elevated temperature and low pressure, then subjecting the gases to a secondary cracking reaction under increased temperature and increased pressure while in the presence of steam and hydrogen pre-activated by electrical discharge and finally subjecting the vaporous mixture to further increased pressure while reacting in the presence of a catalyst.

GUSTAV EGLOFF.